United States Patent Office 3,240,868
Patented Mar. 15, 1966

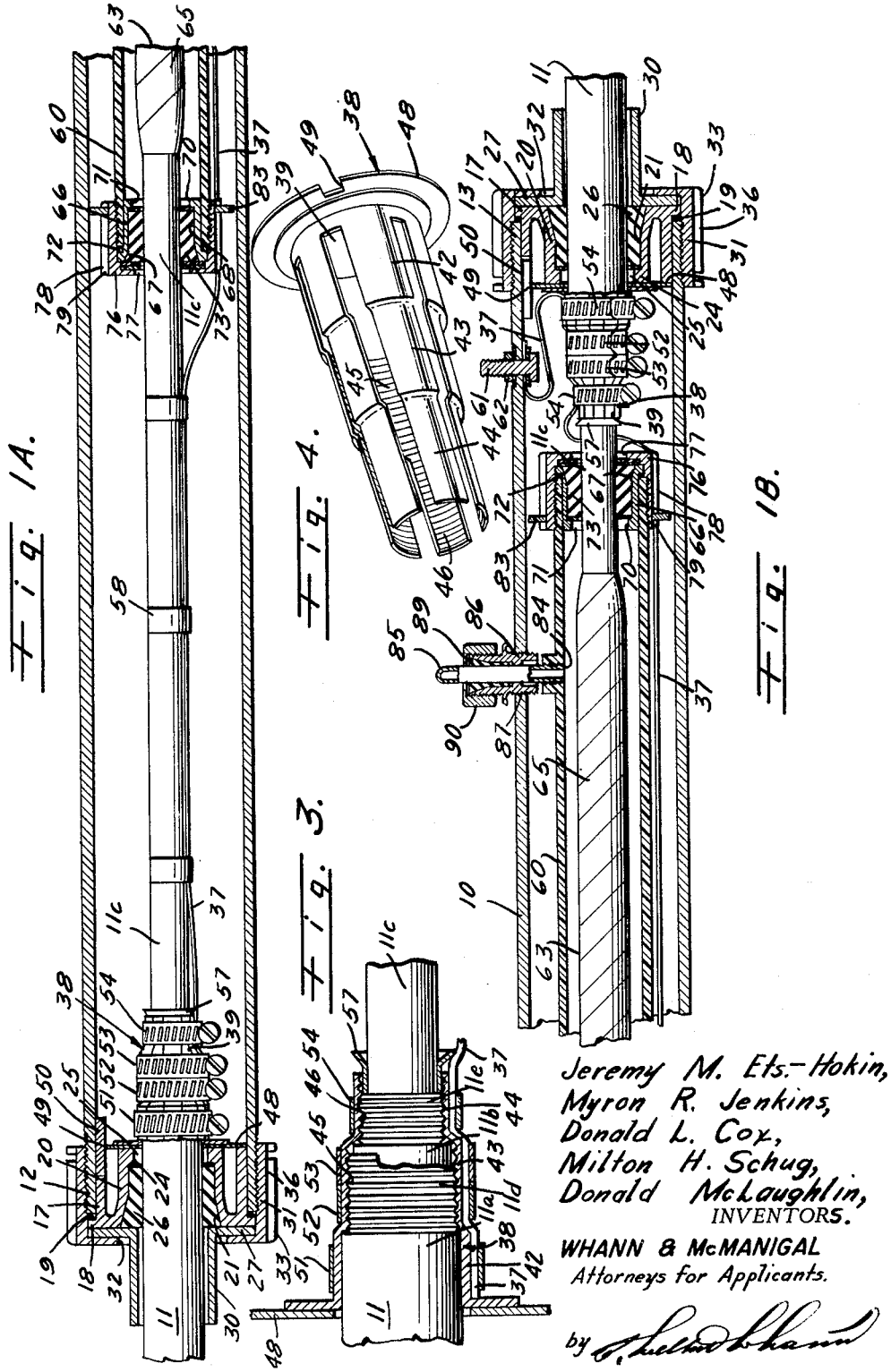

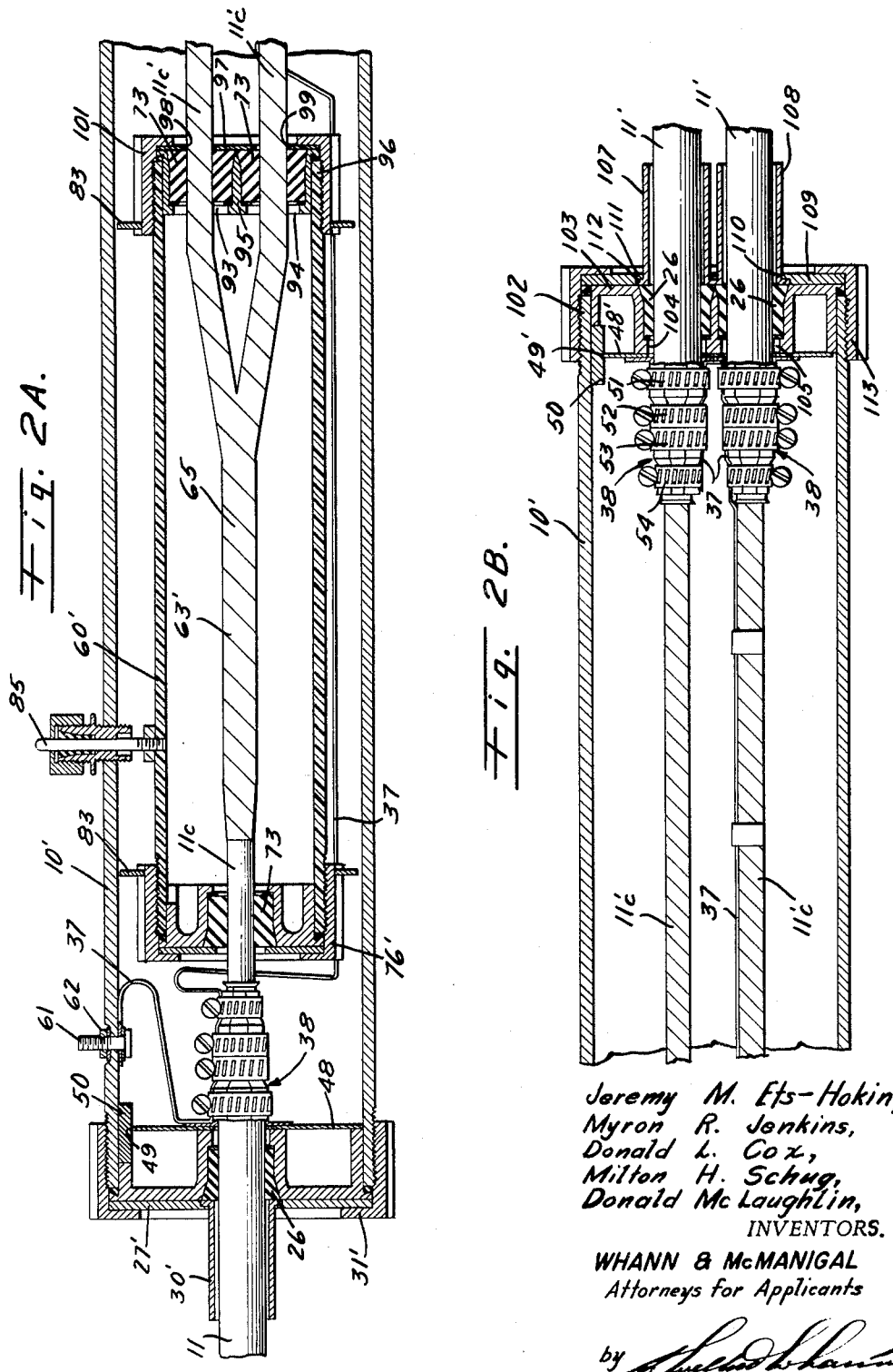

3,240,868
SEALED ENCLOSURE FOR SPLICED CABLES
Jeremy M. Ets-Hokin, San Francisco, Myron R. Jenkins and Donald L. Cox, Wilmington, Milton H. Schug, Palos Verdes, and Donald McLaughlin, Lakewood, Calif., assignors to Ets-Hokin & Galvan, Inc., Wilmington, Calif., a corporation of California
Filed Oct. 18, 1961, Ser. No. 145,842
6 Claims. (Cl. 174—93)

This invention relates to spliced cables and, more particularly, to sealed casings for enclosing the cable splices.

In installations requiring long runs of cables, the ends thereof are joined by splicing. These splices require special protection as they are a serious source of moisture leaks into the cable. This causes serious sound disturbances in communication cables and tends to cause grounding.

It is an object of the present invention to provide an improved, sealed cable splice enclosure.

It is another object of the present invention to provide a sealed splice enclosure having an anticocking device which prevents the seal from being broken by movement of the cable where the cable enters the enclosure. Typically, where there is no such device, the bending of the cable immediately outwardly of the enclosure or casing tends to break the seal between the cable and the enclosure.

It is still another object of the present invention to provide an improved grounding clamp which grips the ground line to the cable armor and shielding.

It is still another object of the present invention to provide an inner casing within an outer casing, the inner casing being adapted to contain a cable splice and in which said inner casing is longitudinally off center with respect to the outer casing.

It is a still further object of the present invention to provide an antitorquing locking device to prevent rotation of the cable while the casing caps, through which the cable extends, are being rotatably secured on the ends of the casing.

It is another object of the present invention to provide means to radially center the cable and the inner casing within the outer casing.

Further objects and advantages of the invention may be brought out in the following part of the specification wherein small details have been described for the competence of disclosure, without intending to limit the scope of the invention which is set forth in the appended claims.

Referring to the accompanying drawings, which are for illustrative purposes only:

FIG. 1A is a side elevational view, partly in cross section, of one end of an outer casing and of an inner casing containing a cable splice;

FIG. 1B is a side elevational view, showing a continuation of FIG. 1A, including the other end of the said casings and splice;

FIG. 2A is a side elevational, partially cross sectioned view of one end of a cable splice enclosure, in which the splice is made by joining two cables so as to form one;

FIG. 2B is a view of the other end of the enclosure shown in FIG. 2A;

FIG. 3 is a fragmentary, side elevational view illustrating the cable protective coverings and the ground clamping means and FIG. 4 is a perspective view of the ground gripping means having an antitorquing lock recess.

Referring now to FIGS. 1A and 1B, there is shown a cable splice enclosure comprised of an outer steel protective casing 10 having an armored and shielded cable 11 sealingly secured in each of its threaded ends 12 and 13.

Since both ends of the casing and the structures fitted therein are identical, only one will be described. Fitted to the shoulder on cylindrical casing end 12 is a generally cylindrical gland 17 having a flange 18 which extends outwardly over the ends of the pipe and is spaced therefrom by a seal 19. Extending inwardly from a central portion of flange 18 is an opening 21 defined by a partially frusto-conical and partially cylindrical wall 20 which terminates in radially inwardly directed lips 24 so as to define opening 25.

The opening 21 formed inwardly of wall 20 is designed to receive a generally frusto-conical rubber grommet 26 in which cable 11 is sealingly engaged. Longitudinally outwardly of and in abutment with grommet 26 and the outer surface of flange 18 is a radial flange 27 of an anticocking or antibend sleeve 30 which surrounds cable 11 outwardly of cylindrical casing 10.

The cable 11, the grommet 26, the gland 17, and the anticocking sleeve 30 are secured in place on the end of the casing by means of a cap 31, threadedly engaged with the end of the casing. The cap is generally cup-shaped, having a central opening 32 through which sleeve 30 extends. The outer circumferential surface of the cap has lands 33 and grooves 36 to provide wrench-engaging surfaces. The cap, anticocking device and gland are made of nylon for its insulative and lightweight properties.

As shown in FIG. 3, the cable 11 has five protective coverings. The outer covering 11a, the intermediate covering 11b, and the inner covering 11c are made of insulating materials, such as rubber. The second covering from the exterior is the armor 11d which is comprised of serrated, corrugated or thread-formed metal tubing, and between the intermediate covering 11b and the inner covering 11c is a metallic electrical shielding tube 11e made in the same form of the armor. Adjacent each of the ends of the outer casing 10, the covering layers 11a, 11b, 11d, and 11e are removed to form the step arrangement of layers, as shown in FIG. 3. That is, looking at the upper half of FIG. 3, the outer covering 11a forms the highest step, and the armor 11d, the insulation 11b, the sheathing 11e and the inner insulation 11c form the successively descending steps.

To properly ground the entire structure, a metal braid 37 is extended through the full length of the outer casing. It is secured at both ends by a ground gripping tubular member 38, as may be best seen in FIG. 4. The tubular portion has longitudinal slots 39 and the remaining body portion of the member 38 is formed to provide three successively smaller, generally cylindrical portions 42, 43 and 44 to fit respectively on the outer surface of step layers 11a, 11d and 11e. To provide a better fit with 11d and 11e, the cylindrical portions 43 and 44 are serrated at 45 and 46, respectively, and the largest diameter portion 42 has a smooth cylindrical interior surface to conform to the surface of the insulation material 11a. At the large diameter end of the member 38, there is a radially directed flange 48 in which there is cut a rectangular keyway 49. As best seen in FIGS. 1A and 1B, when the member 38 is moved into position along the cable covering 11c to its position adjacent one of the ends of the outer casing, the keyway 49 is positioned to slide over a rectangular key 50, secured to the inner surface of the outer casing in the longitudinal direction. Thus, when keyway 49 is moved into engagement with key 50, the tubular member 38 cannot rotate within the outer casing.

To secure the grounding braid 37 to the metallic tubular member 38 and to the cable structure so that good contact is made between the braid 37, the member 38 and the surfaces of the armor 11d and the shielding tubing 11e, four band clamps 51, 52, 53 and 54 are tightened on the three cylindrical portions of the member 38. The body portions 42, 43 and 44 between the slots 39 effectively form spring fingers and are flexible to be tightened on the various parts with which they make contact. To protect the inner insulation 11c, a flared bushing 57 is provided between the covering 11c and the end of member 38 formed by cylindrical portion 44. Longitudinally inwardly of member 38, braid 37 is secured to the cable by tapes 58 and then along an inner casing 60. As shown in FIG. 1B, the braid 37, engaged by member 38 and its clamps, extends to the wall of the outer casing 10 to which it is secured by bolt 61, extending outwardly of the outer casing, and by nut 62.

The sealed inner casing 60, made of plastic, such as polyvinyl chloride, is shown in FIGS. 1A and 1B as being longitudinally off center, that is, remote from the left end in FIG. 1A and adjacent the right end in FIG. 1B. Extending into inner casing 60 are the small diameter or inner portions 11c of the cables 11 which are joined by the splice 63. Only the exterior of the splice is shown, the former being formed by the wrapping tape 65.

The ends of the casing 60 and their sealing structures are identical. The latter are comprised of a generally cylindrical gland 66 which has an enlarged outer tapered opening 67 from which extends to form the interior surface of the gland, a substantially cylindrical surface 68. The latter terminates in a radially inwardly extending flange 70, defined by a central opening 71. Each gland 66 is fitted into its respective end of the inner casing and is spaced from the end of the latter by a seal 72.

Sealingly engaged in each gland is a rubber grommet 73 through which extends cable portion 11c in a sealed relationship. A generally cup-shaped compression cap 76 is threadedly engaged with the casing and holds grommet 73 in compression to form the seal with the gland 66 and with the cable portion 11c. Cap 76, like cap 31, has a central opening 77, through which the cable 11c extends, and has lands and grooves 78 and 79, respectively, on its outer cylindrical surface to provide a means for easy tightening. The inner casing 60 is centered radially within the outer casing 10 by means of centering disks 83 which are slidably engaged with lands and grooves 78 and 79 on caps 76.

Threadedly engaged through an opening 84 in the wall of casing 60 is a pressure testing tube or riser 85, having its outer end closed and its inner end open. The tube 85 also extends outwardly through casing 10 through a sleeve 86 threadedly engaged in an opening 87 in the outer casing. A grommet 89 is fitted within the sleeve 86 and surrounds riser 85. A cap 90 is threadedly engaged with the outer end of sleeve 86 so as to compress grommet 89 and form a seal around riser 85.

For communication cables, the above described structures provide an ideal shielding and sealing enclosure for a cable splice. It is most important to keep moisture out of communication cables in that moisture is a source of undesirable disturbances and also a source of grounding. To keep the interior of the cable dry, nitrogen or neutral air is typically pumped through the inner covering 11c of cables. Since it is difficult to seal a splice, the inner casing 60 provides the seal for the neutral air or nitrogen and when leaks or grounds develop in the cable between splices, a test of the pressure within the inner casing, made by removing the riser 85 and inserting in its stead a gauge, can be used to calculate the exact location of the leak, based upon distance relative to pressure drop.

As a cable is typically flexible, when it is handled it tends to bend and such bends would break the seals within the caps 31 on the outer casing. This is prevented by the anticocking device 30 which limits the bends in the cable to portions externally of the latter device.

Another pertinent feature of the present invention is the tubular member 38, which with the band clamps forms a grounding clamp to make contact with different layers of the partially stripped cable. This, coupled with the key 50 and the keyway 49 in the flange 48 of the grounding clamp assembly, prevents the rotation of the cable when the caps 31 are secured to the outer casing.

Another important feature in the present invention is the longitudinal off-centering of the inner casing and the splice with respect to the outer casing. As a result of doing this, the grommets 73 need not be split in that they are only moved over the small portions of cable 11c. Thus, the grommet 73 in FIG. 1A is positioned to the left adjacent the shielding 11e and the other grommet 73 is similarly placed on the other end of the cable before the splice is made. The inner casing 60 is also placd to the left in FIG. 1A and after the splice is made, it may be moved to the right into its present position and the unsplit grommets 73 can be moved into their positions within the inner casing without having to be placed upon a cable size larger than that of portion 11c.

In FIGS. 2A and 2B, another embodiment of the invention is illustrated. Here the cap 31', similar to cap 31 in FIGS. 1A and 1B, sealingly engages a cable 11 with respect to outer casing 10'. The anticocking device is made in two parts, a sleeve 30' and a flange 27' through which the sleeve extends. Again, the grounding clamp 38 is identical to the grounding clamps in the first embodiment and the grounding braid 37 is secured to the outer casing 10' by means of a bolt and nut 61 and 62, respectively.

The single portion of the cable 11c is sealingly engaged with a grommet 73 in the inner casing 60' by means of a compressive cap 76' through which the cable portion 11c extends. Here, within the inner casing 60' the splice 63' is formed with one cable portion 11c on the left and two cable portions 11c' on the right.

Each of the cable portions 11c' extend through separate openings 93 and 94 in a gland 95 which is sealingly engaged in end 96 of inner housing 60'. In each gland opening 93 and 94 is a rubber grommet 73 which provides the respective seals for the cable portions 11c'. Plate 97, having openings 98 and 99, is fitted in abutment with the outer surfaces of the grommets 73 and the respective cables 11c' extend through the openings 98 and 99. A cap 101 is threadedly engaged with end 96 and as it is tightened, it forces plate 97 against the grommet 73 to form the compressive seal. The inner casing is centered within the outer casing 10' by means of the centering disks 83 slidably engaged with the caps 76' and 101.

In FIG. 2B, a grounding clamp assembly formed by the tubular members 38 and the band clamps 51, 52, 53 and 54 is fitted on the cables 11' in the same manner as the assembly is shown to be fitted on the cable 11 in FIG. 3. Here, the grounding braid 37 extends from the lower assembly to the upper assembly and terminates with the latter. The two tubular members 38 are joined by a flange 48' through which the cables 11' extend and which have a keyway 49' engaged with key 50 secured in casing end 102 of casing 10'. This locks the clamped tubing and the clamping means against rotation within the outer casing.

In end 102 is a gland 103 having openings 104 and 105 in which are fitted grommets 26 and the cables 11' extend through the respective grommets. Outwardly of the gland 103 and the grommets 26 and in abutment therewith is a double anticocking device formed of a pair of parallel sleeves 107 and 108 through which the cables 11' extend. The anticocking device is held in place by a plate 109 having a central opening 110 formed by an inwardly extending radial flange 111 which overlaps externally thereof, a flange 112 extending from the base of sleeves 107 and 108. In turn, plate 109 is held in place by cap 113 sealingly and threadedly engaged with outer casing 10'.

In the embodiment shown in FIGS. 2A and 2B, the splice 63' is protected against moisture so as to prevent communication disturbances, and the pressure drop of the gas pumped within the cable may be determined by removal of the test risers 85 from which the location of cable leaks may be determined.

The invention and its attendant advantages will be understood from the foregoing description and it will be apparent that various changes may be made in the form, construction and arrangement of the parts of the invention without departing from the spirit and scope thereof or sacrificing its material advantages, the embodiments hereinbefore described being merely for the purposes of illustration.

We claim:

1. In an enclosure for sealing a cable splice, an outer elongated, sealed casing; an inner elongated, sealed casing, said inner casing being within said outer casing; a cable extending through said casings, said cable being spliced and having its splice within said inner casing; an outer layer of insulating material surrounding said cable; a layer of metal armor immediately inwardly of said outer layer; an intermediate layer of insulating material within said armor; a layer of shielding metal inwardly of said intermediate layer; an inner layer of insulating material inwardly of said shielding layer; portions of said metal layers of armor and shielding being exposed within and adjacent the ends of the outer casing to form inwardly decreasing stepped diameters of said cable; generally cylindrical means having stepped diameters decreasing from a large diameter end to grip said cable within said outer casing and adjacent each of its ends, said last means having longitudinal slots extending from the large diameter end circumferentially spaced to form stepped diameter spring fingers, said stepped diameters of said fingers inwardly decreasing from said large diameter ends and contacting said exposed layers of said armor and shielding of corresponding diameters; grounding means gripped by said last means and secured to said outer casing for grounding, said grounding means contacting said exposed layers of metal; caps rotatably secured on said ends of said outer casing, said caps having longitudinal openings in which said cable sealingly extends; and a flange extending radially outwardly from said means to grip keyed to said outer casing to prevent the rotation of said cable when said caps are being rotatably secured to said outer casing.

2. In an enclosure for sealing a cable splice, an outer elongated, sealed casing; an inner elongated, sealed casing, said inner casing being within said outer casing; a cable extending through said casing, said cable being spliced and having its splice within said inner casing; an outer layer of insulating material surrounding said cable; a layer of metal armor immediately inwardly of said outer layer; an intermediate layer of insulating material within said armor; a layer of shielding metal inwardly of said intermediate layer; an inner layer of insulating material inwardly of said shielding layer; portions of said metal layer of armor and shielding being exposed within and adjacent the ends of the outer casing to form inwardly decreasing stepped diameters of said cable; generally cylindrical means having stepped diameters decreasing from a large diameter end to grip said cable within said outer casing and adjacent each of its ends, said last means having longitudinal slots extending from the large diameter end circumferentially spaced to form stepped diameter spring fingers, said stepped diameters of said fingers inwardly decreasing from said large diameter ends and contacting said exposed layers of said armor and shielding of corresponding diameters; grounding means gripped by said last means and secured to said outer casing for grounding, said grounding means contacting said exposed layers of metal; caps rotatably secured on said ends of said outer casing, said caps having longitudinal openings in which said cable sealingly extends; a flange extending radially outwardly from said means to grip keyed to said outer casing to prevent the rotation of said cable when said caps are being rotatably secured to said outer casing; an anticocking seal sleeve extending outwardly of each of said caps and surrounding said cable, said sleeves each having a radially outwardly extending flange secured within said caps, said inner casing being longitudinally off center within said outer casing and being adjacent one end thereof; and sealed means connecting said inner casing with the exterior of said outer casing for testing the pressure within said inner casing.

3. The invention according to claim 2 in which said spring fingers having internal serrations and in which said exposed metal surfaces are correspondingly formed to mate with said serrations.

4. The invention according to claim 3 in which said grounding means is a metal braid extending from one means to grip at one end of said outer casing to the other means to grip at the other end of said outer casing, said grounding means being secured to said outer casing by a bolt extending outwardly thereof.

5. In an enclosure for sealing a cable splice, an outer elongated, sealed casing; an inner elongated, sealed casing, said inner casing being within said outer casing; a pair of cables extending through one end of said outer casing and through a corresponding one end of said inner casing, said cables being spliced into one cable, the splice being within said inner casing, said one cable extending through the outer corresponding ends of said casing; an outer layer of insulating material surrounding each of said cables; a layer of metal armor immediately inwardly of said outer layer; an intermediate layer of insulating material within said armor; a layer of shielding metal inwardly of said intermediate layer; an inner layer of said insulating material inwardly of said shielding layer; portions of said metal layers of armor and shielding being exposed within and adjacent the ends of said outer casing to form inwardly decreasing stepped diameters of said cable; generally cylindrical means having stepped diameters decreasing from a large diameter end to grip said cables within said outer casing and adjacent each of its ends, said last means having longitudinal slots extending from the large diameter end circumferentially spaced to form stepped diameter spring fingers, said stepped diameters of said fingers inwardly decreasing from said large diameter ends and contacting said exposed layers of said armor and shielding of corresponding diameters; grounding means gripped by said last means and secured to said outer casing for grounding, said grounding means contacting said exposed layers of said metals; caps rotatably secured on said ends of said outer casing, said caps having longitudinal openings in which said cables sealingly extend; and a flange extending radially outwardly from said means to grip keyed to said outer casing to prevent the rotation of said cable when said caps are being rotatably secured to said outer casing.

6. In an enclosure for sealing a spliced cable, an elongated sealable casing; metal spring-fingered means grippingly secured on each opposite end portion of a spliced cable within said casing adjacent its ends and having fingers contacting an exposed metal protective layer on the cable; grounding means in cooperating contact with said last means and being secured to said casing for grounding; and sealing closures secured on opposite ends of said casing, said closures having longitudinal openings therethrough and having said cable extending through said openings.

References Cited by the Examiner

UNITED STATES PATENTS

| | | | |
|---|---|---|---|
| 1,137,931 | 5/1915 | Travers et al. | 174—93 X |
| 2,771,502 | 11/1956 | King et al. | 174—92 |
| 2,930,835 | 3/1960 | Bollmeier | 174—92 X |
| 2,972,004 | 2/1961 | Merrell et al. | 174—63 X |
| 2,996,567 | 8/1961 | Channell et al. | 174—92 |
| 3,055,972 | 9/1962 | Peterson | 174—77 X |
| 3,061,666 | 10/1962 | Duvall et al. | 174—77 X |

FOREIGN PATENTS

| | | |
|---|---|---|
| 633,847 | 12/1949 | Great Britain. |
| 832,589 | 4/1960 | Great Britain. |

JOHN F. BURNS, *Primary Examiner.*

JOHN P. WILDMAN, *Examiner.*